US011403467B2

(12) United States Patent
Deleuze et al.

(10) Patent No.: US 11,403,467 B2
(45) Date of Patent: Aug. 2, 2022

(54) SEMANTIC CORRECTION OF MESSAGES

(71) Applicant: International Business Machines Corporation, Armonk, NY (US)

(72) Inventors: Ivan Deleuze, Montpellier (FR); Victor Tardieu, Montpellier (FR); Anthony Morales, Montpellier (FR); Gael Ayouba, Montbazin (FR)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 16/834,082

(22) Filed: Mar. 30, 2020

(65) Prior Publication Data

US 2021/0303797 A1  Sep. 30, 2021

(51) Int. Cl.
*G06F 40/30* (2020.01)
*G06F 40/166* (2020.01)

(52) U.S. Cl.
CPC ............ *G06F 40/30* (2020.01); *G06F 40/166* (2020.01)

(58) Field of Classification Search
None
See application file for complete search history.

(56) References Cited

U.S. PATENT DOCUMENTS

| 7,712,024 | B2 * | 5/2010 | Reynar | ................... G06F 40/30 715/230 |
| 8,832,197 | B2 | 9/2014 | Lang | |
| 9,166,939 | B2 | 10/2015 | Rasmussen et al. | |
| 10,489,506 | B2 | 11/2019 | Cietwierkowski et al. | |
| 2008/0162643 | A1 | 7/2008 | Flach | |
| 2009/0327914 | A1 | 12/2009 | Adar | |
| 2011/0313757 | A1 | 12/2011 | Hoover | |
| 2011/0320548 | A1 * | 12/2011 | Jonsson | ................... G06F 40/30 709/206 |
| 2016/0147731 | A1 * | 5/2016 | Parikh | ..................... H04L 67/30 715/261 |
| 2016/0170958 | A1 | 6/2016 | Chan et al. | |

(Continued)

FOREIGN PATENT DOCUMENTS

| CA | 2177942 C | 3/2002 |
| CN | 103249015 A | 8/2013 |

(Continued)

OTHER PUBLICATIONS

Jones et al., "Contextual Spelling Correction Using Latent Semantic Analysis" ANLC '97: Proceedings of the fifth conference on Applied natural language processing, Mar. 1997 pp. 166-173. (Year: 1997).*

(Continued)

*Primary Examiner* — Amelia L Tapp
(74) *Attorney, Agent, or Firm* — Grant Johnson

(57) ABSTRACT

A method comprising receiving a first message sent by a first user, receiving a second message sent by the first user, wherein the second message is received after the first message, semantically analyzing the second message to determine whether the second message contains a desired modification of the first message, and in response to the semantic analysis of the second message, automatically modifying, by the processor, the first message with the desired modification. The method may be a computer implemented method performed using a network interface and a processor.

18 Claims, 10 Drawing Sheets

| FIRST USER (SENDER) | | SECOND USER (RECIPIENT) | |
|---|---|---|---|
| SMS1 | I BOUGHT BLACK SHOES TODAY | SMS1¹ | I BOUGHT WHITE SHOES TODAY |
| SMS2 | OOPS, WHITE | | 901B |

901A

(56) References Cited

U.S. PATENT DOCUMENTS

| | | | |
|---|---|---|---|
| 2017/0337176 A1* | 11/2017 | Cietwierkowski | G06F 40/253 |
| 2018/0329982 A1* | 11/2018 | Patel | G06F 40/40 |
| 2019/0286711 A1* | 9/2019 | Terry | G06F 40/295 |
| 2019/0361981 A1 | 11/2019 | Leydon et al. | |

FOREIGN PATENT DOCUMENTS

| | | |
|---|---|---|
| CN | 105872997 A | 8/2016 |
| WO | 2013143233 A1 | 10/2013 |

OTHER PUBLICATIONS

Wang et al., "An Intelligent Semantic Agent for e-Learning Message Communication" Proceedings of the 19th International Conference on Advanced Information Networking and Applications (AINA'05), copyright 2005 IEEE, 4 pages. (Year: 2005).*

"The Stanford Parser: A statistical parser," The Stanford Natural Language Processing Group, Printed Nov. 18, 2019, 12 pages, https://nlp.stanford.edu/software/lex-parser.shtml.

"How to check whether a sentence is correct (simple grammar check in Python)?," Stack Overflow, Printed Nov. 18, 2019, 1 pages, https://stackoverflow.com/questions/10252448/how-to-check-whether-a-sentence-is-correct-simple-grammar-check-in-python.

Deleuze, "Dyamic Text Correction," U.S. Appl. No. 16/353,572, filed Mar. 14, 2019.

"Determine if a sentence is an inquiry," Stack Overflow, Printed Nov. 18, 2019, 1 page https://stackoverflow.com/questions/4083060/determine-if-a-sentence-is-an-inquiry.

Mell et al., "The NIST Definition of Cloud Computing," Recommendations of the National Institute of Standards and Technology, U.S. Department of Commerce, Special Publication 800-145, Sep. 2011, 7 pages.

Deleuze et al., "Semantic Correction of Messages for Groups," U.S. Appl. No. 16/834,147, filed Mar. 30, 2020.

List of IBM Patents or Patent Applications Treated as Related, Dated Mar. 27, 2020, 2 pages.

Screen captures fro YouTube vido clip entitled "Unsend or Delete A Sent Message in Facebook Messenger", 2 pages, uploaded on Feb. 10, 2019 by user "Mike". Retrieved from Internet: <https://www.youtube.com/watch?v=C8wnmN1ehc>.

* cited by examiner

| FIRST USER (SENDER) | | SECOND USER (RECIPIENT) | |
|---|---|---|---|
| SMS1 | I BOUGHT SHOES TODAY | SMS1¹ | I BOUGHT BLACK SHOES TODAY |
| SMS2 | BLACK | | |

| FIRST USER (SENDER) | | SECOND USER (SENDER) | |
|---|---|---|---|
| SMS1 | I BOUGHT SHOES TODAY | SMS1 | I BOUGHT SHOES TODAY |
| SMS2 | BLACK | SMS2 | SENDER MODIFIED THE PREVIOUS MESSAGE |
| | | SMS1¹ | I BOUGHT BLACK SHOES TODAY |

702A     702B

| FIRST USER (SENDER) | | SECOND USER (RECIPIENT) | |
|---|---|---|---|
| SMS1 | PLEASE OPEN THE OOR | SMS1¹ | PLEASE OPEN THE DOOR |
| SMS2 | D | | |

| FIRST USER (SENDER) | | SECOND USER (SENDER) | |
|---|---|---|---|
| SMS1 | PLEASE OPEN THE OOR | SMS1 | PLEASE OPEN THE OOR |
| SMS2 | D | SMS2 | SENDER MODIFIED THE PREVIOUS MESSAGE |
| | | SMS1¹ | PLEASE OPEN THE DOOR |

| FIRST USER (SENDER) | | SECOND USER (RECIPIENT) | |
|---|---|---|---|
| SMS1 | I BOUGHT BLACK SHOES TODAY | SMS1¹ | I BOUGHT WHITE SHOES TODAY |
| SMS2 | OOPS, WHITE | | |

| FIRST USER (SENDER) | | SECOND USER (SENDER) | |
|---|---|---|---|
| SMS1 | I BOUGHT BLACK SHOES TODAY | SMS1 | I BOUGHT BLACK SHOES TODAY |
| SMS2 | OOPS, WHITE | SMS2 | SENDER MODIFIED THE PREVIOUS MESSAGE |
| | | SMS1¹ | I BOUGHT WHITE SHOES TODAY |

902A

902B

US 11,403,467 B2

SEMANTIC CORRECTION OF MESSAGES

BACKGROUND

The present disclosure relates generally to the field of electronic communications, and more specifically, to applying natural language processing (NLP) to identify and clarify ambiguous and/or erroneous language in messaging systems.

Electronic communication devices are utilized by many users to send electronic messages to one another. For example, a user may send a message to one or more other users by using a smartphone. The very convenience of messaging, however, leads to a degree of informality.

SUMMARY

According to some embodiments of the present disclosure, a method comprising receiving a first message sent by a first user, receiving a second message sent by the first user, wherein the second message is received after the first message, semantically analyzing the second message to determine whether the second message contains a desired modification of the first message, and in response to the semantic analysis of the second message, automatically modifying, by the processor, the first message with the desired modification. The method may be a computer implemented method performed using a network interface and a processor.

According to some embodiments of the present disclosure, a text correction system comprising a server communicatively coupled to a plurality of message devices. The server may comprise a processor coupled to a memory. The processor and the memory may be configured to perform a method comprising receiving a first message sent from a first message device in the plurality of message devices, forwarding the first message to one or more other message devices in the plurality of message devices, receiving a second message sent from the first message device, semantically analyzing the second message to determine whether the second message contains a desired modification of the first message; and in response to the semantic analysis of the second message, automatically modifying the first message with the desired modification. The second message may be received after the first message.

According to some embodiments of the present disclosure, a computer program product comprising a computer-readable storage medium having program instructions embodied therewith, wherein the computer-readable storage medium is not a transitory signal per se. The program instructions may be executable by a processor to cause the processor to perform a method comprising receiving a first message sent by a first user, receiving a second message sent by the first user, semantically analyzing the second message to determine whether the second message contains a desired modification of the first message; and in response to the semantic analysis of the second message, automatically modifying the first message with the desired modification. The second message may be received after the first message;

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7A illustrates one method for correcting an unread message, in accordance with embodiments.

FIG. 7B illustrates one method for correcting a read message, in accordance with some embodiments.

FIG. 8A illustrates one method for inserting a letter into a word in an unread message, in accordance with some embodiments.

FIG. 8B illustrates one method for inserting a letter into a word in a read message, in accordance with some embodiments.

FIG. 9A illustrates one method for substituting a word in an unread message, in accordance with some embodiments.

FIG. 9B illustrates one method for substituting a word in a read message, in accordance with embodiments.

Figure 1:
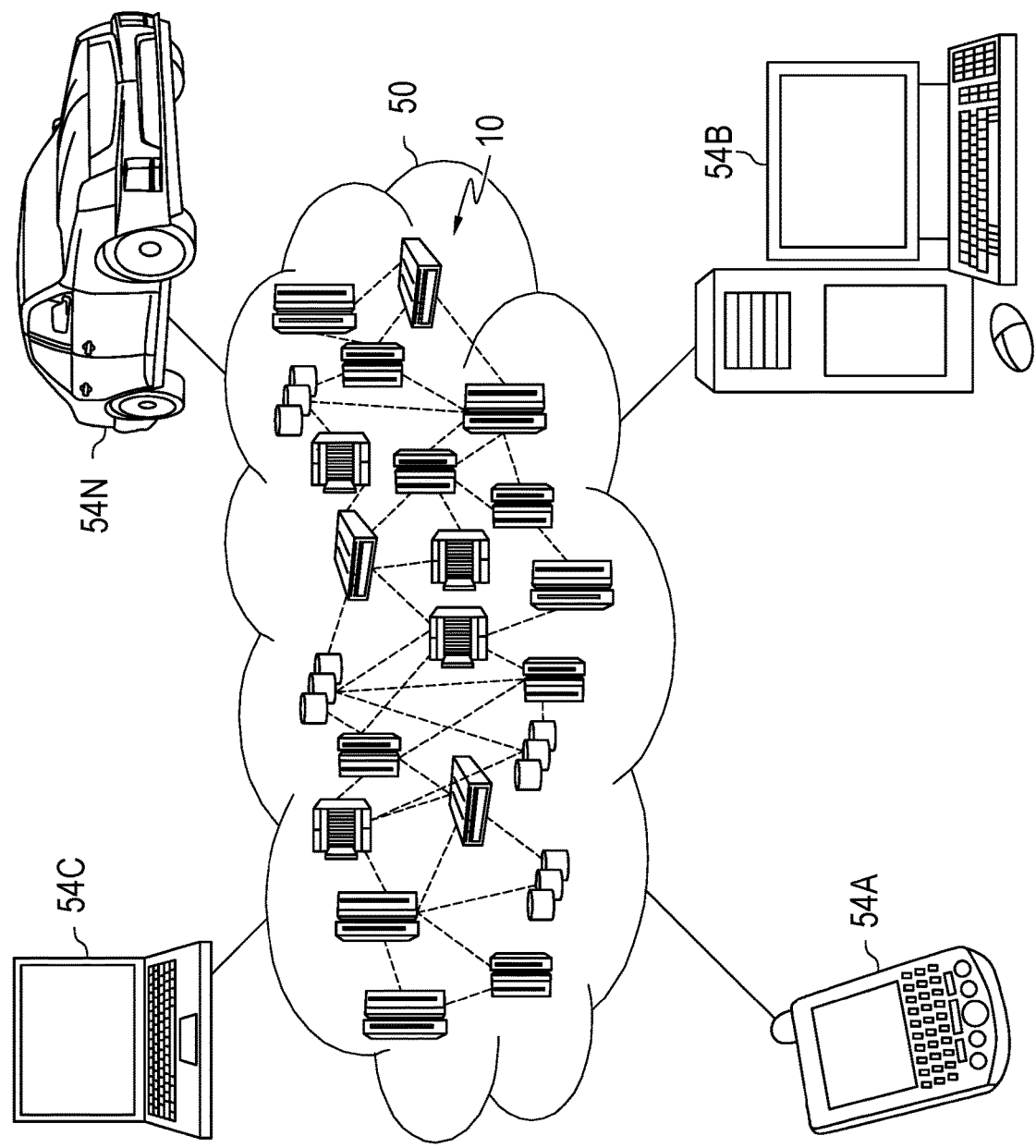
FIG. 1 depicts a cloud computing environment, in accordance with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to electronic communication, and more particularly, aspects relate to applying natural language processing (NLP) to identify and clarify ambiguous and/or erroneous language in messaging systems. While the present disclosure is not necessarily limited to such applications, various aspects of the disclosure may be appreciated through a discussion of various examples using this context.

Electronic communication devices (e.g., smartphones, tablets, computers, etc.) are utilized by many users to send messages (e.g., text messages, email, SMS, Internet-based mobile messaging services, etc., generically referred to herein as "messages" or "SMS") to one another. For example, a user may send a message to one or more other users by using a smartphone. In some instances, the user may send a message containing an error or ambiguity, but only recognize that error or ambiguity after the first message has been sent. Correcting or pointing out the error or ambiguity in a previous message may take time and may disrupt the flow of the message conversation.

Accordingly, some embodiments use NLP to read and interpret the semantic meaning of messages in a conversation, and then look for patterns that indicate that the user wanted to modify an earlier message. Some embodiments include a server-based CPU & memory capability that has awareness of the fact that the participants of the discussion have read or not read a message, and has awareness of the rhythm of a discussion. Other embodiments may be primarily implemented on one or both of the client devices. The client or server in these embodiments may, in a first phase, look for the event that indicates the user may want to fix an error or ambiguity that was made, or otherwise modify the language in the earlier message. As an illustrative example:

User1 sent message 1: "Can you please send me your assessment".

After few seconds, User1 sends message 2: "tax"

Some embodiments may analyze message 1, "Can you please send me your assessment" as a valid sentence or response, and thus, not trigger any event. Those embodiments may then analyze the second message "tax," as-is. Because the message 2 is not a valid sentence nor a response to an earlier message from another user (i.e., the second message does not appear to answer to a question that was previously asked), some embodiments may trigger internally an event based on message 2.

With continuing reference to the illustrated example, this event may be analyzed by a second function that may try to find if the message "tax" could be a word that was intended to be integrated into message 1. To do that, some embodiments calculate a correctness score indicative of whether or not message 1 would make sense with "tax" replacing all of the available words and/or if located in all the available placeholders and/or if appended/prepended to all of the available words e.g., "tax you please send me your assessment" will be rated as having a low correctness score.

"Can tax please send me your assessment" will be rated as a low correctness score.

. . .

"Can you please send me your tax" will be rated as a medium correctness score.

"tax Can you please send me your assessment" will be rated as a low correctness score.

"Can tax you please send me your assessment" will be rated as a low correctness score.

. . .

"Can you please send me your tax assessment" will be rated as a high correctness score.

. . .

"Cantax you please send me your assessment" would be rated as a low correctness score.

"Can taxyou please send me your assessment" would be rated as a low correctness score.

Because the message "tax" alone did not appear to be a valid message and because that message can be combined with the previous message to form one message with a high correctness score, some embodiments may conclude that the message that the sender wanted to share with the other participants was:

"Can you please send me your tax assessment"

If so, some embodiments may automatically, and without additional user action, update the message delivered with this new, corrected, message.

As a second illustrative example:

User1 sent message 1: "Please open the oor".

After few seconds, User1 sends message 2: "d"

Some embodiments may analyze message 1, "Please open the oor" as a valid sentence or response, and thus, not trigger any event. Those embodiments may then analyze the second message "d." Because the message 2 is not a valid sentence nor a response to an earlier message from another user, some embodiments may trigger internally an event based on message 2. This event may be analyzed by the second function to determine if the message "d" could be combined with any words in message 1. To do that, some embodiments calculate a correctness score indicative of whether or not message 1 would make sense with "d" in all of the candidate locations and with "d" appended/prepended to all of the available words. In this second illustrative example, some embodiments may conclude that the message that the sender wanted to share with the other participants was "Please open the door."

Two additional scenarios may be addressed by some embodiments. First, if the receiver has already read the uncorrected message, some embodiments may edit the message in the receiver's graphical messaging application and highlight the correction. Second, if the receiver has not read the "wrong" message, then some embodiments may replace the wrong message with the right message such that the receiver may not be even aware that the message was modified. In both scenarios, the sender may see this message flagged as "modified" in some embodiments and may have the opportunity to "undo" the modification.

One feature and advantage of some embodiments is that they only require minimal interaction from the sending user. That is, the sender has no need to recall the message via an option, no need to select an "edit" function to fix the message, or no need to remember any obscure editing commands. Instead, everything is done in-line using natural language. This, in turn, allows some embodiments to be tuned such that they only modify messages when the sender's intent is clear. Ambiguous messages cases can be passed on and read normally.

Another feature and advantage of some embodiments is increased efficacy versus dictionary-based correction methods. For example, a dictionary-based system may be able to fix a misspelling or other typographical error, but a dictionary cannot detect that a key word, phrase, or punctuation (such as an adjective, a color, a description . . . ) is missing. Moreover, a dictionary cannot know that the sender wishes to replace a correctly spelled word with another one. Yet another feature and advantage of some embodiments is they allow a sender to present a more professional image vs. manual methods, as well as save time and potentially avoid misunderstandings or ambiguity that may not be recognized by the sender. Still another feature and advantage of some embodiments is that they can be added into existing messaging solutions as a plugin or the like.

The aforementioned advantages are example advantages, and not all advantages are discussed. Furthermore, embodiments of the present disclosure can exist that contain all, some, or none of the aforementioned advantages while remaining within the spirit and scope of the present disclosure.

Cloud Computing

FIG. 1 illustrates an embodiment of a cloud environment suitable for an edge enabled scalable and dynamic transfer learning mechanism. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain 3 resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
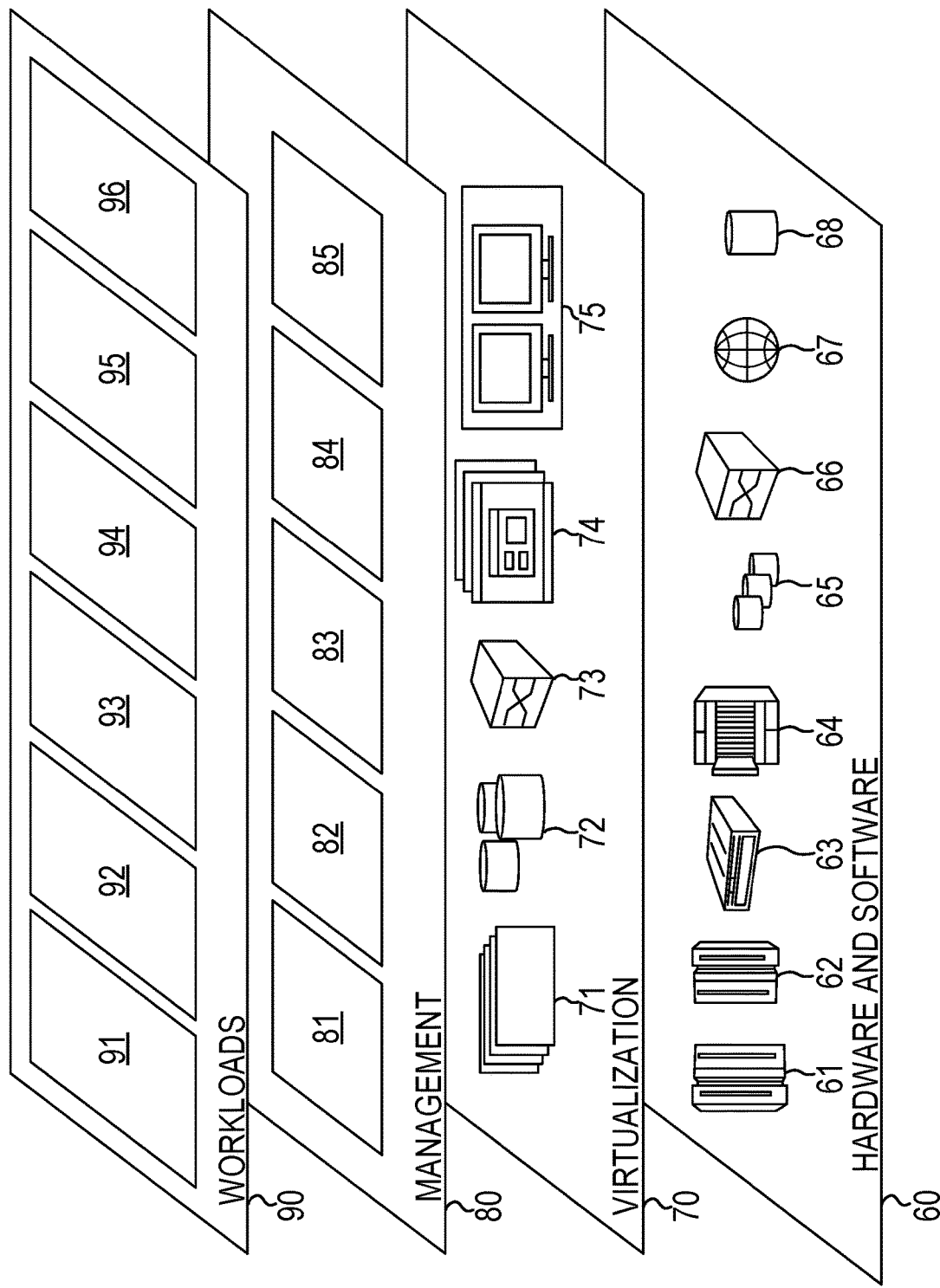
FIG. 2 depicts abstraction model layers, in accordance with some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and messaging system 96.

Data Processing System

Figure 3:
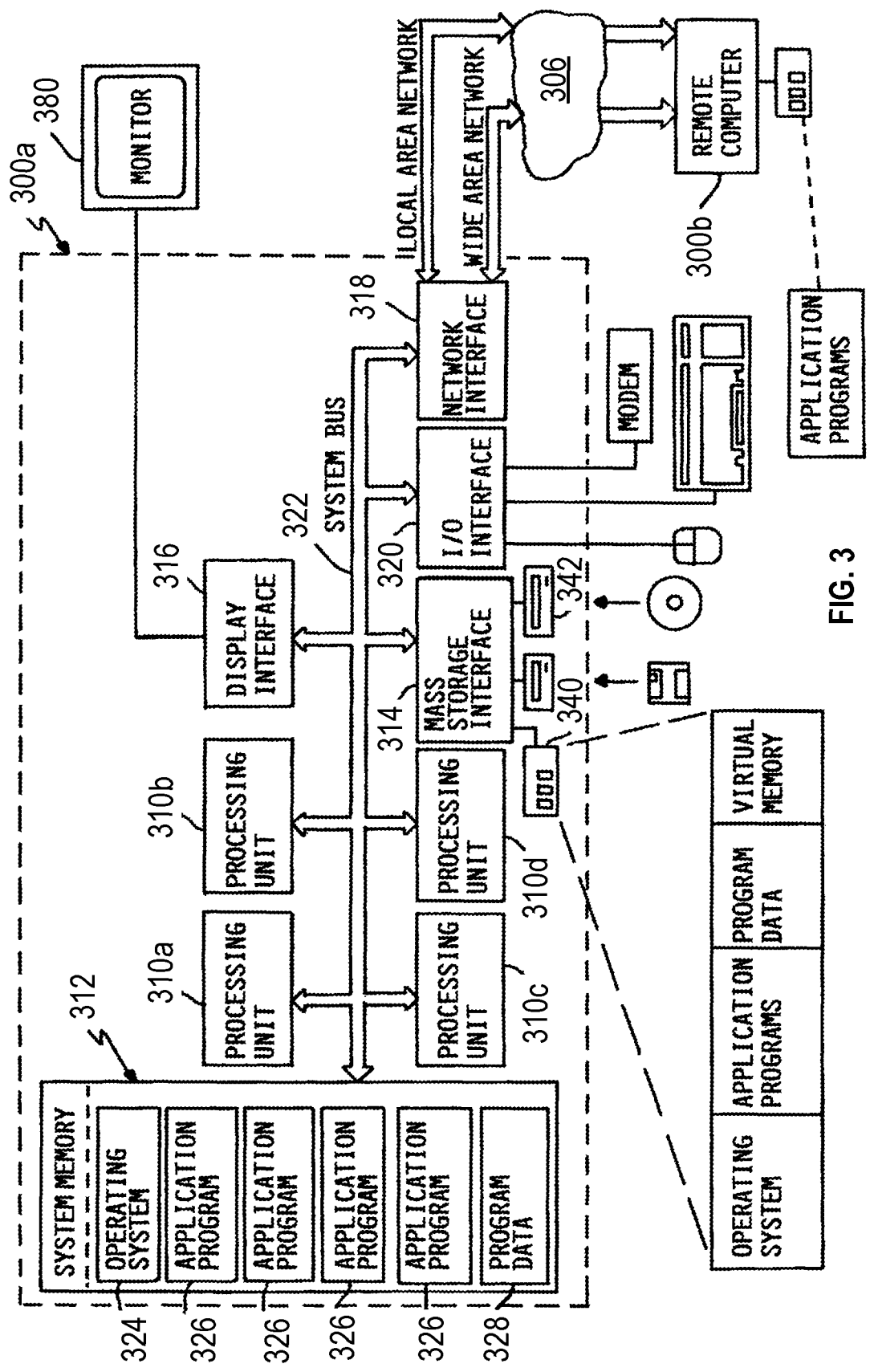
FIG. 3 depicts a data processing system, in accordance with some embodiments.

FIG. 3 illustrates an embodiment of a data processing system (DPS) 300 suitable for use in a cloud environment, such as cloud computing environment 50. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 comprises a plurality of central processing units 310 a-310 d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340 or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multi-processor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 342, which are in communication with the processors 310 through the system bus 322. The program code in the different embodiments may be embodied on different physical or tangible computer readable media, such as the system unit 312 or the mass storage devices 340, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interface units 314, 316, 318, 320 support communication with a variety of storage and I/O devices. The mass storage interface 314 supports the attachment of one or more mass storage devices 340, 342, which are typically rotating magnetic disk drive storage devices, a solid-state storage device (SSD) that uses integrated circuit assemblies as memory to store data persistently, typically using flash memory, or a combination of the two. However, the mass storage devices 340, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units, such as monitor 380, to the data processing system 300. These display units 380 may be non-intelligent (i.e., dumb) terminals, such as an LED monitor, or may themselves be fully programmable workstations used to allow IT administrators and users to communicate with the DPS 300. Note, however, that while the display interface 316 is provided to support communication with one or more display units 380, the computer systems 300 does not necessarily require a display unit 380 because all needed interaction with users and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "Infiniband" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

Semantic Message Correction

Figure 4:
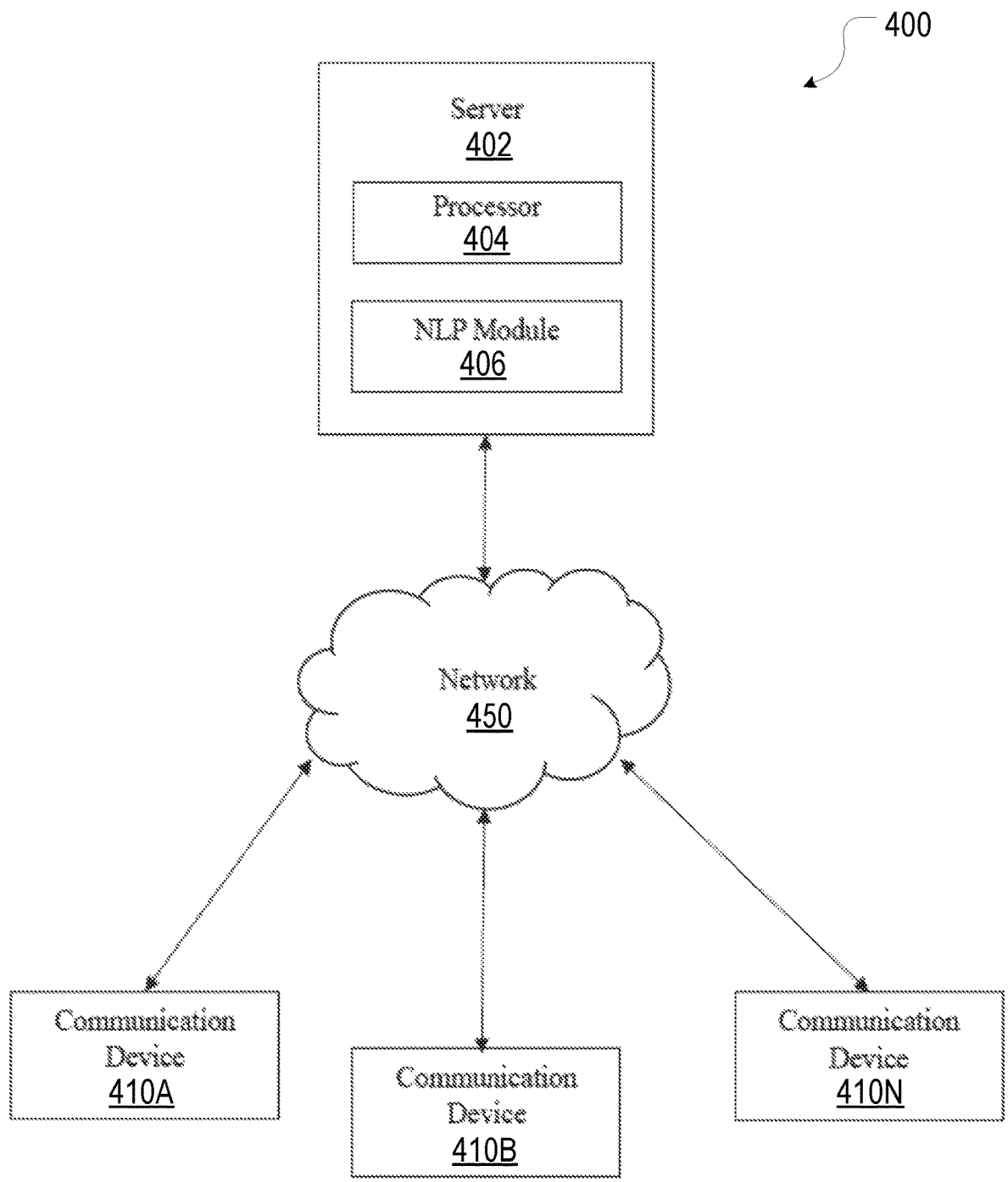
FIG. 4 illustrates a block diagram of a semantic message correction system, in accordance with some embodiments.

FIG. 4 shows a block diagram of a semantic message correction system 400, in accordance with some embodiments. In the illustrated embodiment, the semantic message correction system 400 includes a server DPS 402 and a plurality of client DPS 410A, 410B, . . . 410N (collectively referred to client DPS 410) that are communicatively coupled via a network 450.

The network 450 may be any type of communication network, such as a telecommunications network or the cloud computing environment 50 described with reference to FIGS. 1 and 2, a wide area network (WAN), a local area network (LAN), and/or the Internet. The network 450 can be implemented using any type and number of communications media, such as hardwire connections (e.g., an Ethernet cable) and/or wireless communication networks (e.g., wireless router, telecommunication network, etc.). In some embodiments, the various systems may be communicatively coupled using a combination of one or more networks and/or one or more local connections. For example, the server DPS 402 may communicate with client DPS 410A using a hardwired connection, while communication between the server DPS 402 and client DPS 410N may be through a wireless communication network (e.g., telecommunications network).

The server DPS 402 may be any device or combination of devices configured to store, send, and receive electronic communications (e.g., messages) to and/or from the client DPS 410. In some embodiments, the server DPS 402 embodiments may be a computer system substantially similar to the DPS 300 described with reference to FIG. 3. In other embodiments, the server DPS 402 may be a cellular tower or base station that receives messages from client DPS 410A and forwards the received messages to the client DPS 410B over a control channel.

In the illustrated embodiment, server DPS 402 includes a processor 404 and a natural language processing (NLP) module 406. The NLP module 406 in some embodiments can analyze messages sent and/or received from one or more users to discern the meaning of those messages, and thus, recognize an intent to correct errors and/or make corrections within the message stream. For example, if a user corrects an error in a first message (e.g., by sending a subsequent message containing a desired modification), the NLP module 406 may first determine that the subsequent message contains a desired modification, then determine the most likely location for the desired modification in the first message, and then make the desired modification. As part of this analysis, the NLP module 406 may analyze both messages for context, semantics, grammar, and spelling to determine the appropriate corrective action for the text.

In some embodiments, the server DPS 402 may also use additional machine learning modules (e.g., artificial neural networks) to learn from various corrections previously provided by the user, the user's writing style, and the user's topics of interest. For example, these other machine learning modules may analyze historical message patterns entered by the user for correcting various sentence structures and/or commonly correction markers to better identify messages containing desired modifications and to properly implement those changes.

The client DPSs 410 may be any type of device configured to send and/or receive messages. Some client DPS 410 embodiments may be substantially similar to the DPS 300 described with reference to FIG. 3, while other client DPS 410 embodiments may be a mobile devices (e.g., a smart phone, tablet, etc.), a smart home speaker, smart television/ remote, a driver information center in an automobiles, etc. Client DPS 410 may include a user interface allowing a user to input and receive messages sent to and from other users. For example, a smart phone client DPS 410A may have a texting application in which the user may type, send, and receive text messages to client DPS 410B. Similarly, a smart speaker client DPS 410N may have a speech-to-text interface in which a user can dictate messages to another client DPS 410A.

FIG. 4 depicts the representative major components of the semantic message correction system 400. In some embodiments, however, individual components may have greater or lesser complexity than as represented, components other than or in addition to those shown may be present, and the number, type, and configuration of such components may vary. Likewise, one or more components shown with the system 400 may not be present, and the arrangement of components may vary. For example, while FIG. 4 illustrates an example semantic message correction system 400 having a single server DPS 402, three client DPS 410, and one network 450, suitable network architectures for implementing embodiments of this disclosure may include any number of servers, communication devices, and networks. The various models, modules, systems, and components illustrated in FIG. 4 may exist, if at all, across a plurality of media playback devices, cognitive state determination devices, and databases.

Figure 5A:
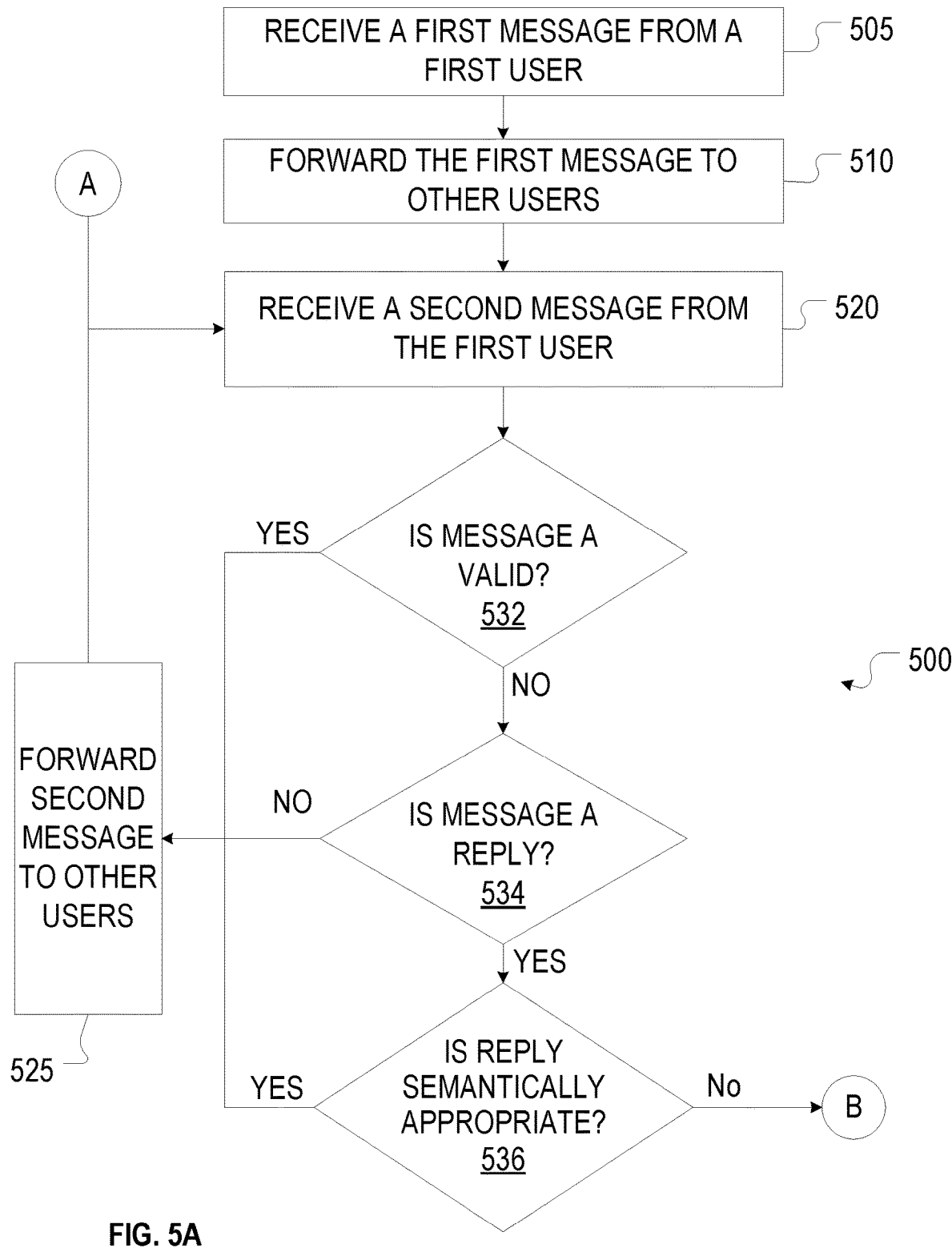
FIGS. 5A and 5B (collectively FIG. 5) illustrate a flow diagram of an example process for correcting a sent message, in accordance with some embodiments.

Referring now to FIG. 5, shown is a flow diagram of an example process 500 for correcting a sent message, in accordance with some embodiments. The process 500 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 500 is a computer-implemented process. The process 500 may be performed by processor 404 in FIG. 4.

The process 500 begins by receiving a first message SMS1 sent by a first user. This is illustrated at block 505. For example, the first user may send the first message SMS1 from a smartphone intended for one or more recipients. In embodiments, the message SMS1 is received at the server DPS 402 (e.g., a cellular tower). The process 500 continues by forwarding the first message SMS1 to one or more other users. This is illustrated by block 510. For example, once the server receives the message SMS1 from the first user, the server forwards the first message SMS1 to the intended recipient(s).

At block 520, the user who sent the first message subsequently determines that this first message SMS1 contains an error and/or ambiguity (e.g., a poor word choice, an incorrect word, a misspelled word, a missing word, a repeated word, etc.). To correct the error and/or ambiguity, the first user types a follow-up message SMS2 containing a desired modification e.g., an additional word(s) or a phrase, the correct word, the correct spelling, etc. For example, if the user realizes a first message SMS1 stating, "Can you please send me your assessment" is ambiguous, the user may follow up after a few seconds with a second message SMS2 containing the word "tax."

The process may continue at blocks 532, 534, and 536, where the second message SMS2 is analyzed to determine whether it is a valid sentence, a response to a previous question, or semantically appropriate. In some embodiments, the system first determines at block 532 whether or not the second message has a valid grammar. One suitable method is to first parse the sentence using a context-free parser. If the second message SMS2 parses, then it is evaluated to be a valid sentence. If the second message SMS2 does not parse, then it is evaluated to be invalid sentence. Another suitable method is to use a wide-coverage parser, such as the Stanford parser, to perform this evaluation.

Second messages SMS2 that appear to form valid sentences are sent to the other user(s) at block 525. Second messages SMS2 that do not appear to form valid sentences are then analyzed to determine if they are responsive to an earlier message from another user. One suitable method is to first determine at block 534 whether the most recent message received by the user (i.e., from another user) contains an inquiry. Some embodiments may evaluate block 534 by performing a syntactic parse of the earlier received message(s) to determine if any tree with an SBARQ node has an embedded SQ node. If the earlier received message(s) is an inquiry, then some embodiments may then determine at block 536 whether the second message SMS2 represents a semantically appropriate answer to that inquiry using NLP techniques. For example, if the earlier received message asked "what time are you available," then "2:00" would be a semantically appropriate answer, whereas 'no' would not be a semantically appropriate answer.

Some embodiments may further tune one or more of the tests used in blocks 532, 534 and 536 to be biased toward false negative errors i.e., these embodiments may only flag the second message SMS2 for additional processing if the second message SMS2 is clearly invalid and/or clearly a semantically valid response. In this way, these embodiments may provide protection against erroneous correction (see FIG. 6). Some embodiments may also analyze the second message(s) SMS against all previous messages received within a predetermined time window at block 536, as opposed to just the most recent message. These embodiments may be desirable if multiple users in a conversation are simultaneously sending and receiving messages.

Figure 5B:
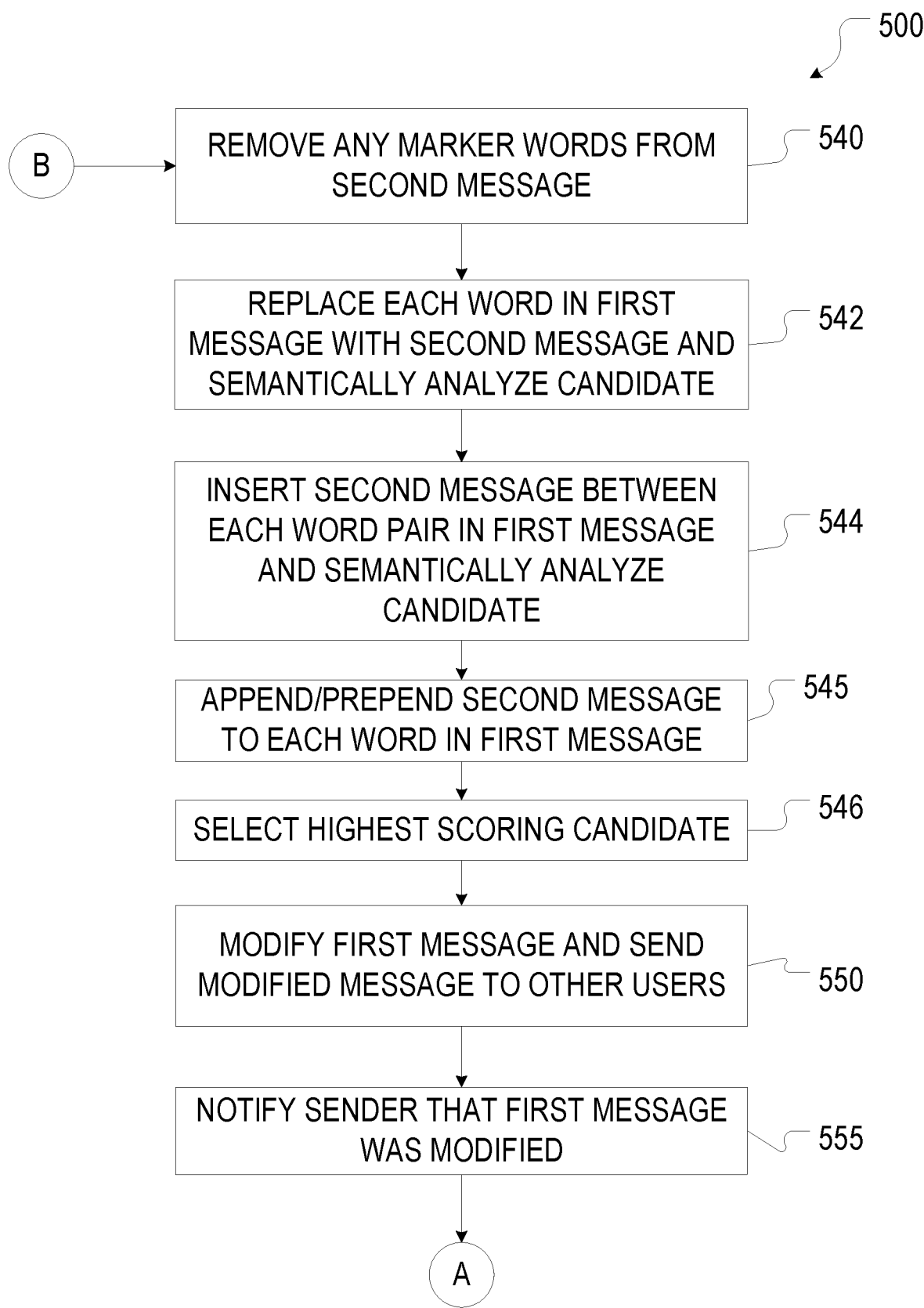

The process 500 may continue at block 540 on FIG. 5B, where the system may parse the second message SMS2 to identify and remove any common marker words indicating or associated with a correction or modification e.g., "oops," "correction," "ack," "sorry," "I meant," and the like. In some embodiments, these marker words may be part of a predefined list. In other embodiments, the list may be dynamically updated based on the user's writing patterns. Next, at blocks 542, 544, 545, and 546, the system may determine a location to make the desired modification of the first message SMS1. At block 542, the processor may first replace each word in the first message SMS1 with the desired modification from the second message SMS2, and then semantically analyze the result using the NLP module 406 to calculate a semantic correctness score (e.g., a value that correlates with how well the candidate message complies with the generally accepted grammar rules for a selected human language) for the resulting candidate messages. Next, at block 544, the processor may insert the desired modification between every pair of worlds in the first message SMS1, and then may semantically analyze the result using the NLP module 406 to calculate a semantic correctness score for each of the resulting candidate messages. At block 545, the processor may append and prepend the desired modification to every word in the first message SMS1, and then semantically analyze the result using the NLP module 406 to calculate a semantic correctness score for each of the resulting candidate messages. At block 546, the processor may sort the candidate messages by semantic correctness score and may select the highest candidate to be the modified first message SMS1[1]. In some embodiments, the processor may create a modified first message SMS1[1] if the semantic correctness score for the highest candidate location is significantly greater than the semantic correctness score for the next-highest candidate location.

For example, if the first message SMS1 is "Can you please send me your assessment" and the second message SMS2 is "tax," some embodiments test if SMS1 would make logical sense with "tax" located in all the available placeholders e.g., "tax you please send me your assessment" will be rated as having a low correctness score.
"Can tax please send me your assessment" will be rated as a low correctness score.
. . .
"Can you please send me your tax" will be rated as a medium correctness score.
"tax Can you please send me your assessment" will be rated as a low correctness score.
"Can tax you please send me your assessment" will be rated as a low correctness score.
. . .
"Can you please send me your tax assessment" will be rated as a high correctness score.
. . .
"Cantax you please send me your assessment" would be rated as a low correctness score.
"Can taxyou please send me your assessment" would be rated as a low correctness score.

The process 500 may continue by automatically making the desired modification in the first message. This is illustrated at block 550. As will be explained in more detail with reference to FIGS. 6-9, once the proper location for the change is determined, the processor may automatically insert the missing word into the sentence from the first message. For example, returning to the "Can you please send me your assessment" example, the processor may insert the word "tax" to produce the corrected version of the first message SMS1[1] as "Can you please send me your tax assessment." Once the first message is corrected, the process 500 may continue by replacing the original version of the first message SMS1 with the corrected version of the first message SMS1[1] to the other users, may the original sender of the change at block 555, and then may return to block 520 on FIG. 5A.

Figure 6:
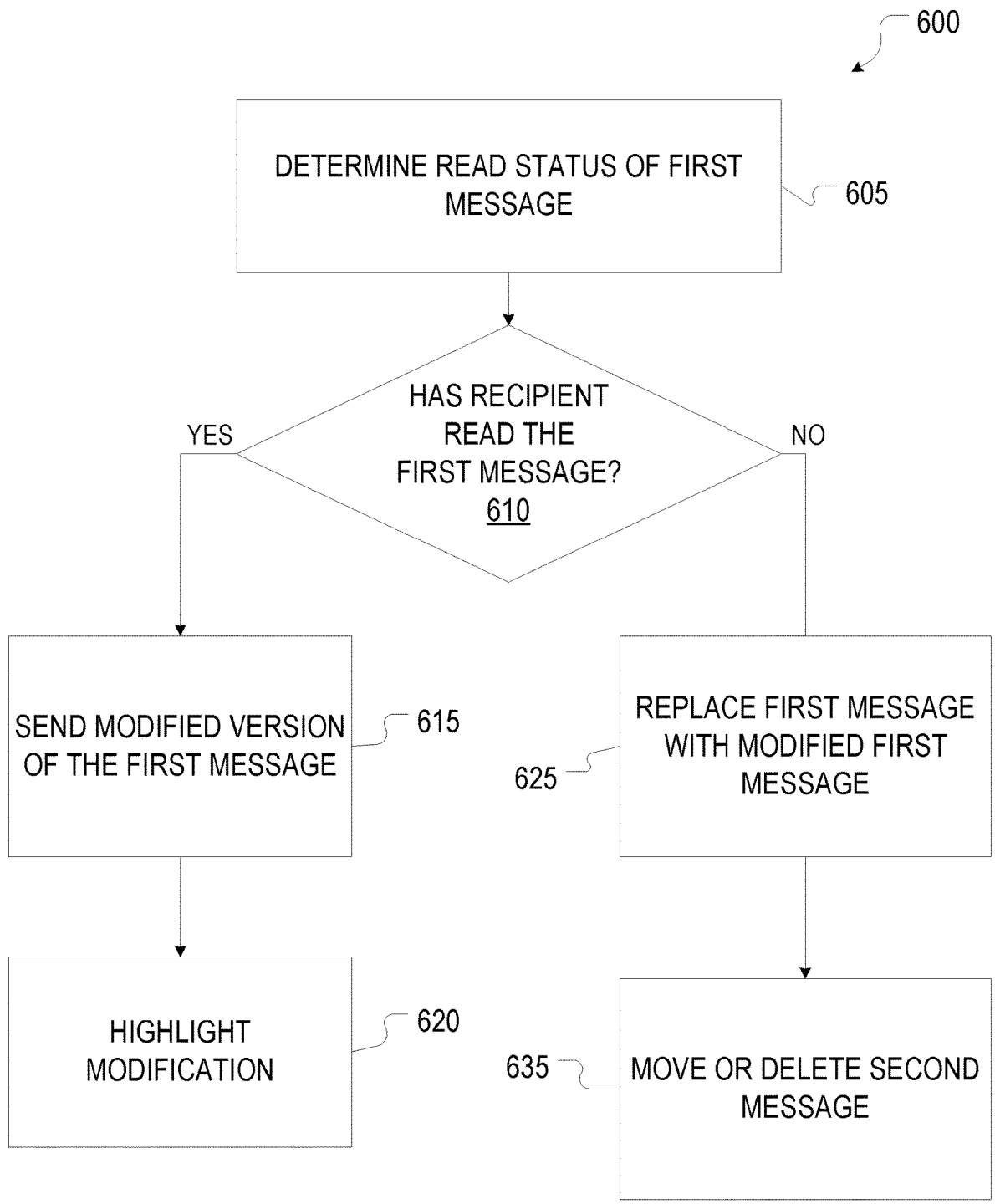
FIG. 6 shows a flow diagram for an example process for sending a corrected version of a message based on read status, in accordance with embodiments.

FIG. 6 shows a flow diagram for an example process 600 for sending a corrected version of a message SMS1[1] based on read status, in accordance with embodiments. Process 600 may be in addition to or a subset of process 500. The process 600 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 600 is a computer-implemented process. The process 600 may be performed by the processor 404 in FIG. 4.

The process 600 begins by determining the read status of the first message SMS1 (e.g., containing an error) for each recipient of the message. This is illustrated at blocks 605-610. If the first message has not been read by one of the recipients, the process 600 continues by sending control messages directing that recipient's messaging client to replace the first message SMS1 with the modified version of the first message SMS1[1]. This is illustrated at block 625. For example, the first message SMS1 is "I like shoes" and the second message SMS2 is "black," the first message SMS1 may be replaced on recipient's user interface with a modified message SMS1[1] "I like black shoes" if the recipient has not read the first message SMS1. In this way, the recipient of the message(s) never sees the first (i.e., undesired or incorrect) version of the message. In some embodiments, the system may also move the second message SMS2 to a different panel, or even delete it, at block 635.

If the first message SMS1 has been read by one of the recipients, the process 600 continues by highlighting the correction in a sent corrected version of the first message SMS1[1] to that recipient. This is illustrated at block 615. For example, the processor may determine the first message containing the error was read by the recipient. Because the recipient read the message, the processor may forward the corrected version of the message SMS1[1] for display in the recipient's messaging client, in addition to the original message SMS1. The system may indicate that what was changed, as depicted in block 620. In some embodiments, the indication may take the form of a highlighted portion where the correction was made. For example, the corrected version of "I like black shoes" may be shown on the recipient's user interface with the word "black" highlighted. In some embodiments, the system may send an additional control message directing the recipient(s) message client(s) to display a special icon or the like to indicate the message was modified. In some embodiments, the system may provide ask the recipient's permission to modify the first message SMS1. For example, a notification may state, "the sender wants to modify the original message." In some embodiments, the system may send a description of the change as a notification or as metadata. For example, a notification may state, "the original text message was missing the word 'black'."

Referring now to FIGS. 7A-7B, 8A-8B and 9A-9B, shown are a pair of graphical user interfaces in messaging clients belonging, respectively, to the sender and the recipient of a string of messages in a conversation. FIG. 7A illustrates one method for correcting an unread message, in accordance with embodiments. In the illustrated embodiment, a first user interface 701A is shown for the sender of the messages and a second user interface 701B is shown for the recipient. A first user (e.g., sender) types a first message SM1 as "I bought shoes today" in the first user interface 701A and sends the message SMS1 to a second user interface 701B. The first user notices there is a missing word in the first message SMS1 and wants to include the word "black" in the message. To correct the first message SMS1, the first user creates and sends a second message SMS2 containing the missing word (e.g., "black"), the missing word with a fragment of the original message (e.g., "black shoes"), the missing word together with human-readable marker word commonly associated with corrections (e.g., "Oops, boots"), or similar human-readable construction. In embodiments, it is contemplated that the desired modification may comprise more than one world or even a phrase. For example, the first user may type "at the mall" and the processor may determine that the phrase should be added at the end of the sentence of message SMS1 (e.g., "I bought shoes today at the mall"). In some embodiments, no special editing commands or special editing-related formatting or character sequences are required. Instead, the user can compose the same second message SMS2 they would if the semantic message correction system 400 (see FIG. 4) were not present or operating.

Once the second message SMS2 is sent, the system may first identify it as a desired correction and determine the proper location of the additional word, as described in more detail with reference to FIG. 5. If the recipient has not read the first message, the system may send control signals directing the second user interface 701B to automatically replace the first message with the corrected version of the message.

FIG. 7B illustrates one method for correcting a read message, in accordance with some embodiments. In the illustrated embodiment, the first user interface 702A includes the same messages as 701A in FIG. 7A. However, in FIG. 7B, the system has determined that the recipient has read the first message SMS1 on the second user interface 702B. In this instance, when the sender corrects the second message SMS2 on the first user interface 701B with the word "black", the recipient receives a notification as SMS2 from the system that sender wanted to change the previous message. The recipient then receives the corrected version of the message SMS1[1] on the second user interface 702B. In some embodiments, the correction may be highlighted to show the second user where the error was in the original message. For example, in message SMS1[1] the word "black" is highlighted on the second user interface 702B to indicate that the word was added to the original message. In other embodiments, the correction may not be highlighted.

FIG. 8A illustrates one method for inserting a letter into a word in an unread message, in accordance with some embodiments. In the illustrated embodiment, a first user interface 801A is shown for the sender of the messages and a second user interface 801B is shown for the recipient. The sender types a first message SMS1 as "Please open the oor" and sends the message to the second user. The sender then notices there is a missing letter in the word door in the first message SMS1 and wants to include the letter "d" to correct the word "oor" in the message. To correct the first message SMS1, the sender creates and sends a second message SMS2 containing the missing letter (e.g., "d"), the correct spelling (e.g., "door"), the correct spelling with a fragment of the original message (e.g., "the door"), the correct spelling together with human readable language commonly associated with corrections (e.g., "Oops, door"), or similar human readable construction. In some embodiments, no special editing commands or special editing-related formatting or character sequences are required. Instead, the user can compose the same second message SMS2 they would if the semantic message correction system 400 (see FIG. 4) were not present or operating.

Once the second message SMS2 is sent, the system may determine where the modification should be placed within the message SMS1 and automatically insert the modification accordingly, as described in more detail with reference to FIG. 5. If the recipient has not read the first message SMS1, the system may send control signals directing the second user interface 801B to automatically replace the first message SMS1 with the corrected version of the message SMS1[1]. For example, the recipient only sees the corrected version of the message as "Please open the door" on the second user interface 801B.

FIG. 8B illustrates one method for inserting a letter into a word in a read message, in accordance with some embodiments. In the illustrated embodiment, the sender creates the same messages as described in FIG. 8A. However, in FIG. 8B, the recipient has read the first message SMS1 on the second user interface 802B. When the first user creates the second message SMS2, the second user receives a notification from the system on the second user interface 802B that the sender wishes to modify the first message SMS1. The recipient then receives the corrected version of the message SMS1[1] on the second user interface 802B. In some embodiments, the correction may be highlighted to show the second user where the change was from the original message SMS1. For example, "door" may be highlighted in the corrected message SMS1[1] on the second user interface 802B.

FIG. 9A illustrates one method for substituting a word in an unread message, in accordance with some embodiments. In the illustrated embodiment, a first user interface 901A is shown for the sender of the messages and a second user interface 902A is shown for the recipient. A first user types a first message SMS1 as "I bought white shoes today" and sends the message SMS1 to the second user interface 902A. The first user notices they typed an incorrect word in the first message SMS1 and wants to substitute the word "black" for the word "white" in the first message SMS1. To correct the first message SM1, the first user types "white," "white shoes," "oops, white," or the like into a second message SMS2 in first user interface 901A. In some embodiments, no special editing commands or special editing-related formatting or character sequences are required. Instead, the user can compose the same second message SMS2 they would if the semantic message correction system 400 (see FIG. 4) were not present or operating.

Once the second message SM2 is sent, the system may determine where to make the substitution, as described in more detail with reference to FIG. 5. If the second user has not read the first message SMS1 on the second user interface 902A, the system may automatically replace the first message with the corrected version of the message SMS1[1]. For example, the second user only sees the corrected version of the message RM2 "I bought black shoes today."

FIG. 9B illustrates one method for substituting a word in a read message, in accordance with embodiments. In the illustrated embodiment, the first user interface 902a includes the same messages as 901A in FIG. 9A. However, the recipient has already read the first message SMS1 on the second user interface 902B. For example, the second user reads the first message RM1 as "I bought white shoes today." When the first user sends the second message SMS2 to substitute the word "black" for the word "white", the second user then receives a corrected version of the message SMS1[1] on the second user interface 902B. In this example, the system does not include a notification indicating there was an error with the original message and only highlights the word "black" to show where the correction was made on the second user interface 902B.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

General

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A computer-implemented method comprising: receiving, by a network interface, a first message sent by a first user; receiving, by the network interface, a second message sent by the first user, wherein the second message is received after the first message; semantically analyzing, by a processor, the second message to determine whether the second message contains a desired modification of the first message; and in response to the semantic analysis of the second message, automatically modifying, by the processor, the first message with the desired modification, comprising:
identifying a candidate location for the desired modification; modifying the first message by inserting a letter, word or phrase at the candidate location to create a candidate message; and calculating a correctness score for the candidate message.

2. The computer-implemented method of claim 1, further comprising:
forwarding, by the network interface, the first message to one or more other users; and
forwarding, by the network interface, the modified first message to the one or more other users.

3. The method of claim 2, further comprising, by the processor:
determining that the first message has not been read by the one or more other users; and
replacing the first message with the modified first message in a message client associated with the one or more other users.

4. The method of claim 2, further comprising, by the processor:
determining that the first message has been read by the one or more other users;
replacing the first message with the modified first message in a message client associated with the one or more other users; and
highlighting the desired modification in the modified first message in the message client associated with the one or more other users.

5. The method of claim 1, wherein semantically analyzing the second message comprises determining whether the second message is a valid sentence or a response to a previous message.

6. The method of claim 1, wherein modification modifying the first message with the second message at the candidate location to create the candidate message comprises:
replacing a word in the first message with the second message to create the candidate message.

7. The method of claim 1, wherein modifying the first message with the second message at the candidate location to create the candidate message comprises:
comprises:
inserting the second message at the candidate location in the first message to create the candidate message.

8. The method of claim 1, wherein automatically modifying the first message with the desired modification further comprises:
creating a plurality of candidate messages;
calculating a correctness score for each of the plurality of candidate message; and
identifying a candidate message with a highest correctness score from the plurality of candidate messages.

9. The method of claim 8, wherein the correctness score is correlated with a degree of compliance with generally accepted grammar rules for a selected human language.

10. The method of claim 1, wherein the second message does not contain editing commands or editing formatting.

11. A text correction system comprising: a server communicatively coupled to a plurality of message devices, wherein the server comprises:
a processor coupled to a memory, wherein the processor and the memory are configured to:
receive a first message sent from a first message device in the plurality of message devices; forward the first message to one or more other message devices in the plurality of message devices; receive a second message sent from the first message device, wherein the second message is received after the first message; semantically analyze the second message to determine whether the second message contains a desired modification of the first message; and
in response to the semantic analysis of the second message, automatically modify the first message with the desired modification, comprising:
identifying a candidate location for the desired modification; modifying the first message by inserting a letter, word or phrase at the candidate location to create a candidate message; and calculating a correctness score for the candidate message.

12. The text correction system of claim 11, wherein the semantic analysis of the second message comprises determining whether the second message is a valid sentence or a response to a previous message.

13. The text correction system of claim 11, wherein the modifying the first message with the second message at the candidate location to create the candidate message comprises:
replacing a word in the first message with the second message to create the candidate message.

14. The text correction system of claim 11, wherein modifying the first message with the second message at the candidate location to create the candidate message comprises:
inserting the second message at the candidate location in the first message to create the candidate message.

15. The text correction system of claim 11, wherein automatically modifying the first message with the desired modification further comprises:

creating a plurality of candidate messages;

calculating a correctness score for each of the plurality of candidate message; and identifying a candidate message with a highest correctness score from the plurality of candidate messages.

16. The text correction system of claim 15, wherein the correctness score is correlated with a degree if compliance with generally accepted grammar rules for a selected human language.

17. The text correction system of claim 11, wherein the second message consists of a human language word or phrase.

18. A computer program product comprising a computer-readable storage medium having program instructions embodied therewith, wherein the computer-readable storage medium is not a transitory signal per se, the program instructions executable by a processor to cause the processor to:

receive a first message sent by a first user;

receive a second message sent by the first user, wherein the second message is received after the first message;

semantically analyze the second message to determine whether the second message contains a desired modification of the first message; and in response to the semantic analysis of the second message, automatically modify the first message with the desired modification, comprising:

identifying a candidate location for the desired modification, modifying the first message by inserting a letter, word or phrase at the candidate location to create a candidate message; and calculating a correctness score for the candidate message.

* * * * *